(12) United States Patent
Holstine et al.

(10) Patent No.: US 11,724,812 B2
(45) Date of Patent: Aug. 15, 2023

(54) SYSTEMS AND METHODS FOR RAIN ABATEMENT IN PARACHUTE PACKING

(71) Applicant: AMI Industries, Inc., Colorado Springs, CO (US)

(72) Inventors: Steve Holstine, Peyton, CO (US); John Hampton, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 308 days.

(21) Appl. No.: 17/214,706

(22) Filed: Mar. 26, 2021

(65) Prior Publication Data
US 2022/0306303 A1  Sep. 29, 2022

(51) Int. Cl.
*B64D 25/10* (2006.01)
*B64D 17/44* (2006.01)

(52) U.S. Cl.
CPC .............. *B64D 25/10* (2013.01); *B64D 17/44* (2013.01)

(58) Field of Classification Search
CPC ........ B64D 25/10; B64D 17/44; B64D 17/32; B64D 17/40; B64D 17/42
See application file for complete search history.

(56) References Cited

U.S. PATENT DOCUMENTS

| | | | | | |
|---|---|---|---|---|---|
| 2,762,589 | A | * | 9/1956 | Frieder | B64D 17/52 244/148 |
| 3,584,815 | A | * | 6/1971 | Stencel | B64D 17/52 244/149 |
| 3,712,568 | A | * | 1/1973 | Grasso | B64D 17/00 244/148 |
| 2018/0312264 | A1 | * | 11/2018 | Cook | B64D 1/08 |

* cited by examiner

*Primary Examiner* — Justin M Benedik
(74) *Attorney, Agent, or Firm* — Snell & Wilmer L.L.P.

(57) ABSTRACT

A recovery parachute assembly may comprise a container comprising an open base end, a parachute packed within the container, a plurality of riser lines and suspension lines packed within the container and proximate the open base end, a tray including a lip configured to receive the open base end of the parachute container, and a first standoff block coupled to the tray, wherein the first standoff block compresses at least one of the riser lines or suspension lines into the base end of the container and away from the tray, wherein the first standoff block defines a channel between the lip of the tray and the first standoff block, wherein the channel includes a plurality of drain holes formed along a distal edge of the tray.

14 Claims, 6 Drawing Sheets

SYSTEMS AND METHODS FOR RAIN ABATEMENT IN PARACHUTE PACKING

FIELD

The present disclosure relates to escape and egress systems, and more specifically, to ejection seat parachute assemblies.

BACKGROUND

Ejection systems are designed to expel pilots from an aircraft cockpit. Ejection seats in high performance aircraft benefit from safely removing the pilot or other seat occupant from the stricken aircraft across a wide variety of aircraft speed regimes, altitudes and aircraft attitudes. High performance aircraft may operate in all-weather environments which may expose ejection systems to high amounts of rain or moisture such as blowing rain before flight. Generally, ejection systems comprise parachute systems which may absorb excessive moisture from the environment. If too much moisture is absorbed by the parachute before flight, the impact on delay or performance characteristics of the occupant's recovery parachute are unknown and may pose inadvertent challenges to bring the occupant safely to the ground.

SUMMARY

In various embodiments, a recovery parachute assembly may comprise a container comprising an open base end, a parachute packed within the container, a plurality of riser lines and suspension lines packed within the container and proximate the open base end, a tray including a lip configured to receive the open base end of the parachute container, and a first standoff block coupled to the tray, wherein the first standoff block compresses at least one of the riser lines or suspension lines into the base end of the container and away from the tray, wherein the first standoff block defines a channel between the lip of the tray and the first standoff block, wherein the channel includes a plurality of drain holes formed along a distal edge of the tray.

In various embodiments, a skirt may be coupled to the container. In various embodiments, the lip defines a first basin and a second basin of the tray, wherein the first standoff block is coupled within the first basin and a second standoff block is coupled within the second basin. In various embodiments, a third standoff block may be coupled within the first basin, wherein the first standoff block and the third standoff block define an interblock channel therebetween. In various embodiments, the skirt includes a flange portion and a deflector portion. In various embodiments, the skirt extends outward of the container and over the lip. In various embodiments, the skirt and the container are monolithic and wherein the first standoff block and the tray are monolithic.

In various embodiments, an ejection seat may comprise a seat bucket, a seat back coupled to the seat bucket, a propulsion system, and a recovery parachute assembly may comprise a container comprising an open base end, a parachute packed within the container, a plurality of riser lines and suspension lines packed within the container and proximate the open base end, a tray including a lip configured to receive the open base end of the parachute container, wherein the tray is coupled to the seat back, and a first standoff block coupled to the tray, wherein the first standoff block compresses at least one of the riser lines or suspension lines into the base end of the container and away from the tray, wherein the first standoff block defines a channel between the lip of the tray and the first standoff block, wherein the channel includes a plurality of drain holes formed along a distal edge of the tray.

In various embodiments, a skirt may be coupled to the container. In various embodiments, the lip defines a first basin and a second basin of the tray, wherein the first standoff block is coupled within the first basin and a second standoff block is coupled within the second basin. In various embodiments, a third standoff block may be coupled within the first basin, wherein the first standoff block and the third standoff block define an interblock channel therebetween. In various embodiments, the skirt includes a flange portion and a deflector portion. In various embodiments, the skirt extends outward of the container and over the lip. In various embodiments, the skirt and the container are monolithic and wherein the first standoff block and the tray are monolithic.

In various embodiments, an article of manufacture is disclosed including a first standoff block configured to be coupled within the first basin of a tray, and a skirt configured to be coupled proximate a base end of a container, wherein the first basin and the second basin are defined by a lip of the tray, wherein a channel is defined between the first standoff block and the lip of the tray in response to coupling the first standoff block within the first basin. In various embodiments, the article of manufacture may further comprise a second standoff block configured to be coupled within the a second basin of the tray. In various embodiments, the skirt extends outward of the container over the lip in response to coupling the skirt to the container when the base end of the container is disposed within the tray.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
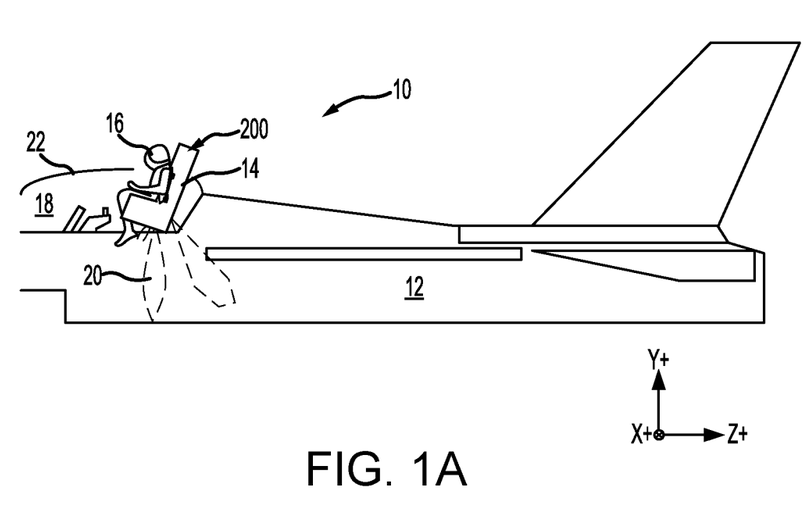
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes recovery parachute assembly 200. Recovery parachute assembly 200 may comprise one or more parachutes configured to recover the seat occupant and enable the occupant 16 to descend safely to the ground after an ejection event.

Figure 1B:
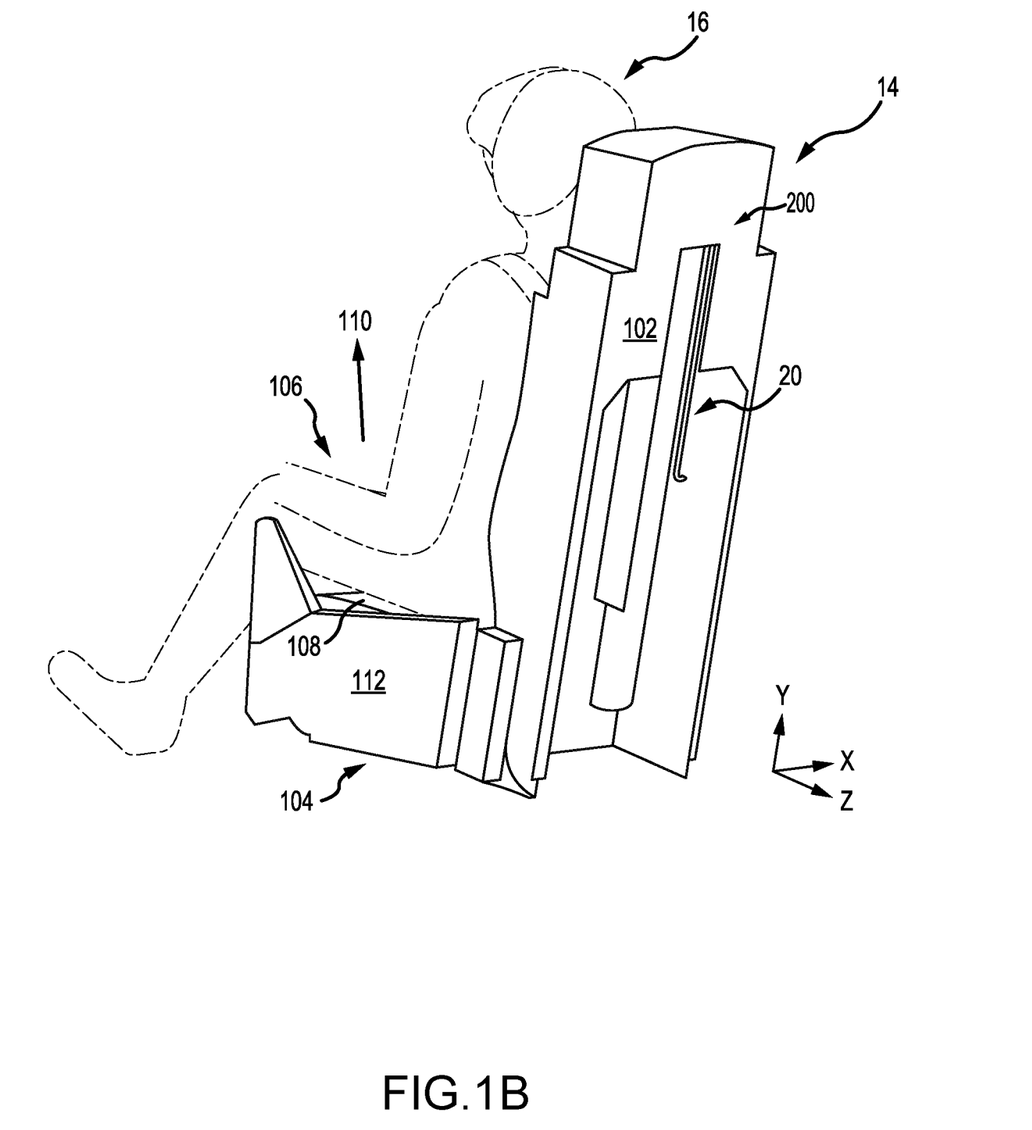
FIG. 1B illustrates an ejection seat having a rain abatement system, in accordance with various embodiments.

With additional reference to FIG. 1B, ejection seat 14 is illustrated with propulsion system 20 in an inactive state, in accordance with various embodiments. Ejection seat 14 includes a seat back 102 and a seat bucket 104. The propulsion assembly 20 is coupled to seat back 102. In various embodiments, an ejection handle 106 may be located proximate a front seat pan 108 of seat bucket 104. Front seat pan 108 of seat bucket 104 is generally opposite, or distal, of seat back 102. While FIG. 1B shows ejection handle 106 located at front seat pan 108 of seat bucket 104, it is further contemplated and understood that ejection handle 106 may be located anywhere that is accessible to the occupant 16 of ejection seat 14. For example, ejection handle 106 may be located on a side 112 of seat bucket 104 or a headrest 114 of seat back 102. In various embodiments, recovery parachute assembly 200 may be located in the upper portion of the seat back 102. For example, the recovery parachute assembly 200 may comprise a headrest portion of the seat back 102 and extend relatively between the head rest portion and a plane defined by the shoulders of the occupant 16.

Figure 2A:
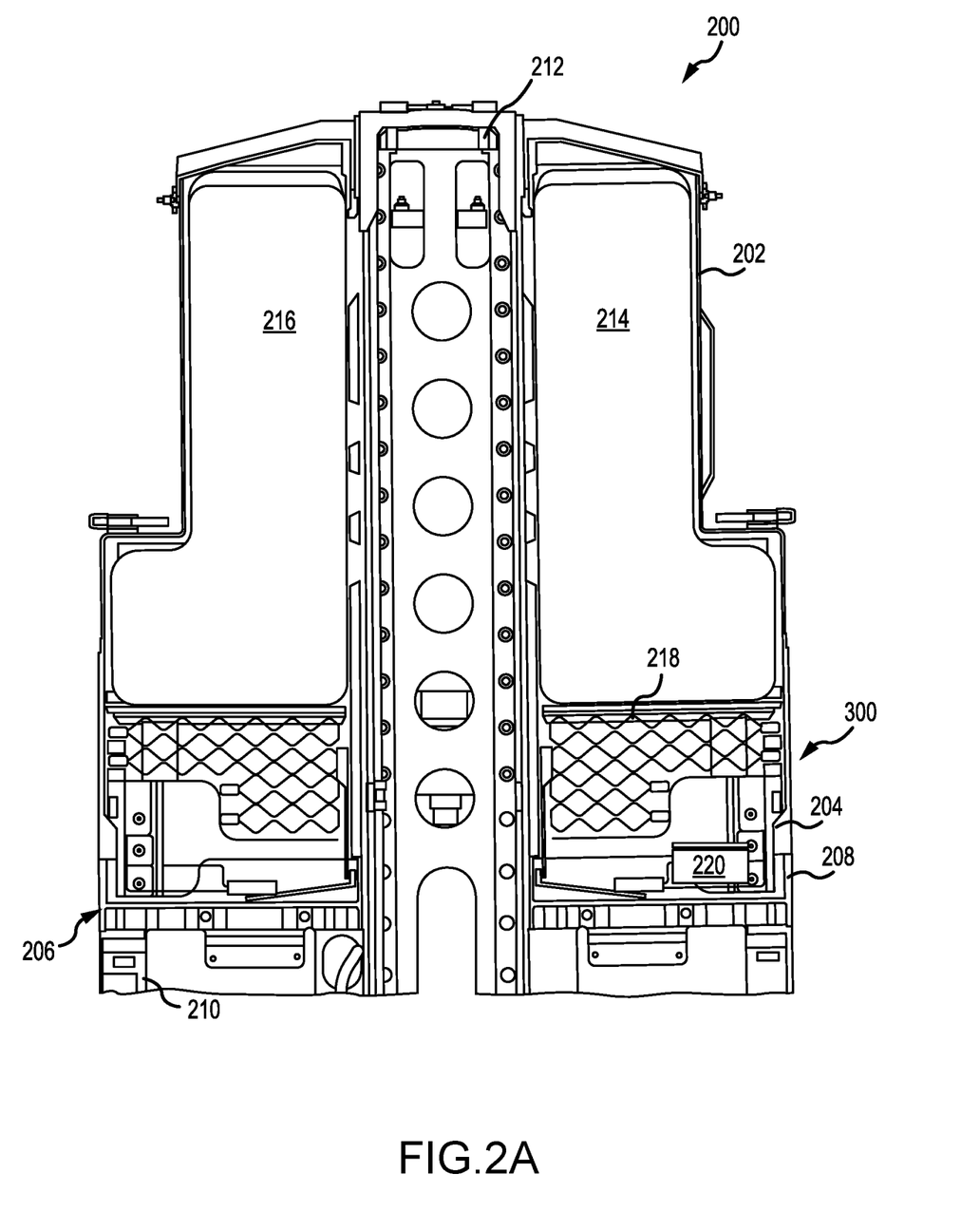
FIG. 2A illustrates a recovery parachute assembly including a rain abatement system, in accordance with various embodiments.
Figure 2B:
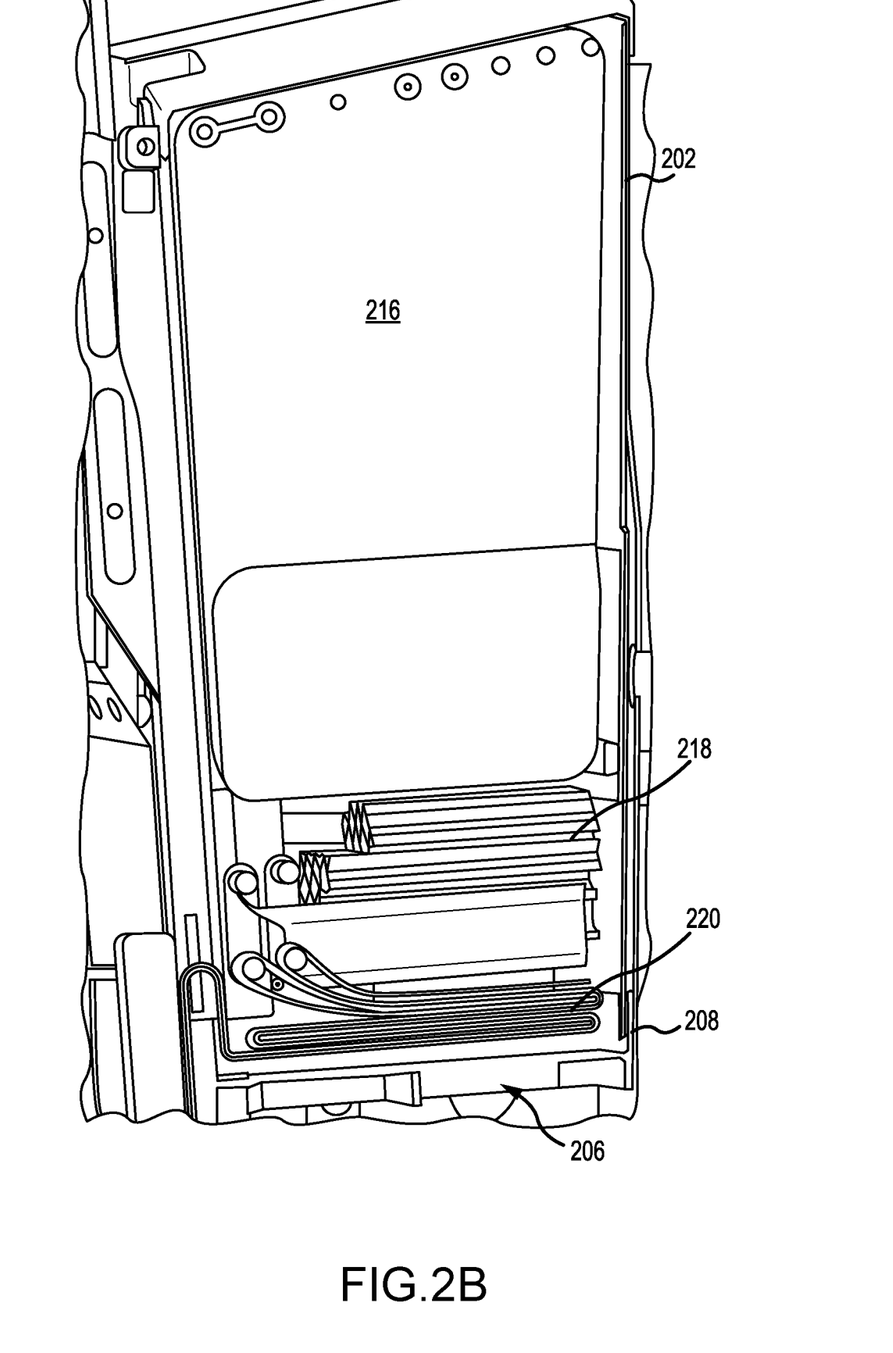
FIG. 2B illustrates a recovery parachute assembly including a rain abatement system, in accordance with various embodiments.

With additional reference to FIGS. 2A and 2B, recovery parachute assembly 200 is illustrated in cross section through the X-Y plane (FIG. 2A) and in cross section through the Y-Z plane (FIG. 2B), respectively. In various embodiments, recovery parachute assembly 200 comprises a container 202 having an open base end 204 configured to be disposed within a tray 206. A rain abatement system 300 may be coupled to the recovery parachute assembly 200 proximate the base end 204 of the container 202. In various embodiments, the tray 206 may be coupled to the seat back 102 via fasteners 210. The tray 206 may be configured to support the container 202 and the container 202 contents prior to separation of the container 202 from the seat 14. In various embodiments, the container 202 may be coupled to the seat back 102 and the base end 204 may be retained within the lip 208 of the tray 206 via a frangible coupling such as, for example, shear elements 212.

In various embodiments, the container 202 may contain and at least partially enclose a drogue parachute 214 and a main parachute 216. The drogue parachute 214 may be configured to stabilize the seat 14 in free flight after exiting the cockpit 18. The drogue parachute 214 may be configured to aid in the extraction and/or deployment of the main parachute 216. Each parachute 214, 216 may be coupled to a plurality of suspension lines (not shown) and riser lines 220. In various embodiments, the container 202 may include a line stowage system 218 configured to enable extraction of the suspension lines and/or riser lines 220 from the container 202 without binding, snagging, or tangling. In this regard, the line stowage system 218 may tend to enable safe deployment of the parachutes 214, 216. In various embodiments, the line stowage system 218 may include a plurality of fluted sheets joined to form a cellular matrix structure. Each cell of the cellular matrix structure may be configured to hold one or more turns of suspension line and/or riser line.

Figure 3:
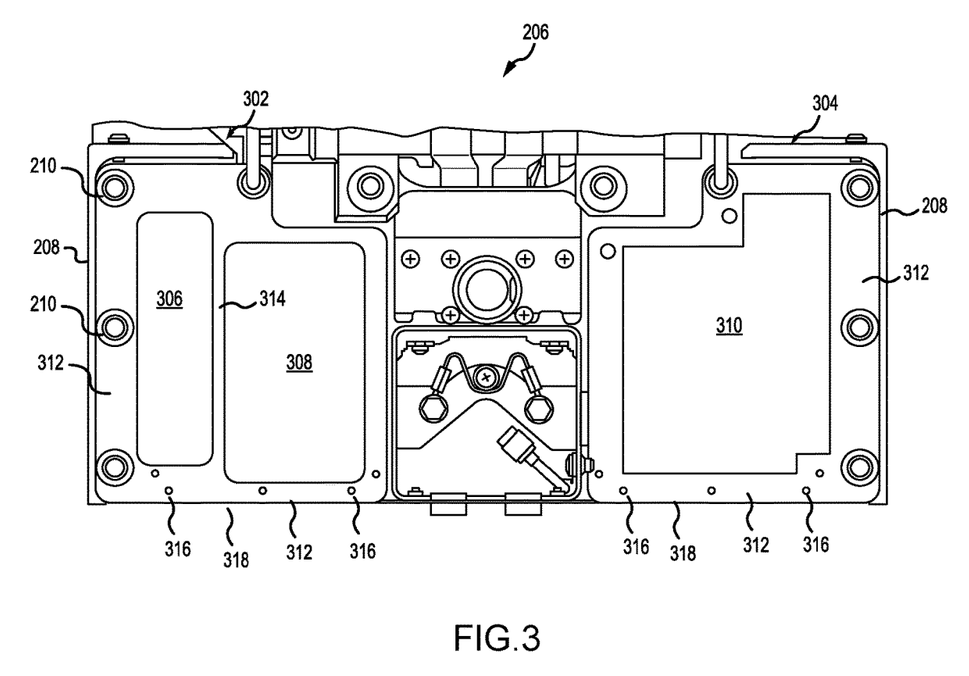
FIG. 3 illustrates a rain abatement system standoff block, in accordance with various embodiments.

In various embodiments and with additional reference to FIG. 3, tray 206 is shown in detail as viewed through the Y-Z plane from the top of the seat 14 toward the lip 208. In various embodiments, the lip 208 may define a first basin 302 and a second basin 304 within the tray 206. Each basin 302, 304 includes at least one standoff block 306, 308, 310 coupled to the floor of the basin 302, 304. For example, the first basin 302 may comprise a first standoff block 306 and a second standoff block 308 and the second basin 304 may comprise a third standoff block 310. Each of the standoff blocks 306, 308, 310 may comprise a part of rain abatement system 300. In various embodiments, the standoff blocks 306, 308, 310 rise from the floor of the respective basin 302, 304. In this regard, the standoff blocks 306, 308, 310 define channels 312 between the respective standoff block 306, 308, 310 and the lip 208. In various embodiments a basin such as the first basin 302 may include an interblock channel 314 defined between the first standoff block 306 and the second standoff block 308.

In various embodiments, the base end 204 of the container 202 may be configured to be disposed within the channels 312. In response to coupling the container 202 to the tray 206, the standoff blocks 306, 308, 310 may tend to compress the contents of the container 202. For example, the plurality of suspension lines and riser lines 220 may be packed within the container 202 proximate the base end 204 and the standoff blocks 306, 308, 310 may compress at least one of the riser lines or suspension lines upward further into the base end 204 and away from the tray 206. In this regard, when the seat 14 is exposed to blowing rain and/or other liquids, the liquid may run down the container 202 along the base end 204 and collect within the channels 312, 314. Channels 312, 314 may include a plurality of drain holes 316 formed in the tray 206. In various embodiments, the drain holes 316 are formed along an edge (i.e. distal edge 318) of the tray 206 distal of the occupant 16. In this regard, the reclined position of the seat back 102 may urge the liquid collected within the channels 312, 314 to collect along the distal edge 318 and drain from the basins 302, 304 via the drain holes 316. In various embodiments, the standoff block 306, 308, 310 may comprise a cast portion, a machined portion, or an additively manufactured portion of the tray 206. In this regard, any of the first standoff block 306, the second standoff block 308, or the third standoff block 310 may be integral or monolithic to the tray 206. In various embodiments, a standoff block 306, 308, 310 may be coupled to the tray 206 such as, for example, by bonding, welding, or fastening. In this regard, channel 312 may be formed in response to coupling a standoff block 306, 308, 310 within the respective basin 302, 304.

Figure 4A:
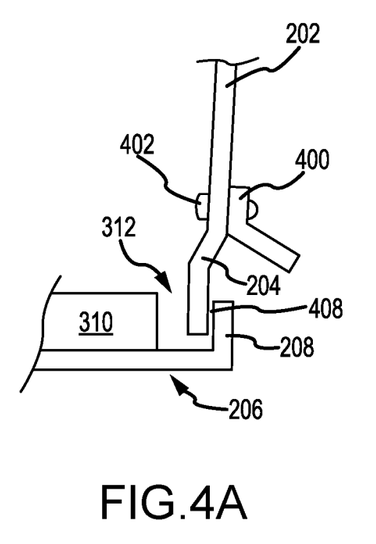
FIG. 4A illustrates a rain abatement system skirt, in accordance with various embodiments.
Figure 4B:
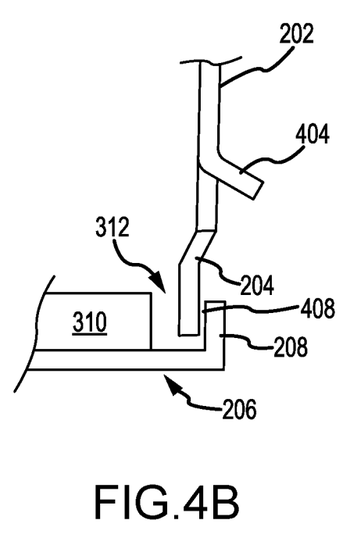
FIG. 4B illustrates a rain abatement system skirt, in accordance with various embodiments.
Figure 4C:
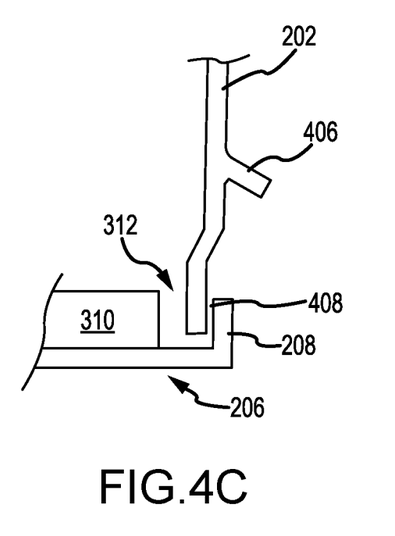
FIG. 4C illustrates a rain abatement system skirt, in accordance with various embodiments.

In various embodiments and with additional reference to FIGS. 4A, 4B, and 4C, details of the interface between the tray 206 and the base end 204 of the container 202 are shown in cross section. In various embodiments, a skirt may include any flange or projection overlapping the interface between the container 202 and the tray 206 and tending to inhibit ingress of fluid into the container 202 via the interface. In various embodiments, as shown in FIG. 4A a skirt 400 may be coupled to the exterior of the container 202 by one or more fasteners 402 such as, for example, a rivet. In various embodiments, the skirt 400 may include a flange portion configured to couple to the exterior of the container 202. The skirt 400 includes a deflector portion extending at an angle to the flange portion (e.g., orthogonal to the flange portion, between 0° and 90° to the flange portion, or between 45° and 90° to the flange portion) and beyond the lip 208. In various embodiments, the flange portion may include a pattern of fastener holes defined by a fastener pattern of the container 202. The skirt 400 may extend along one or more sides of the container 202 and thereby tend to deflect liquid running down the side of the container 202 relatively away from the interface between the base end 204 and the tray 206. In this regard, the skirt 400 may tend to inhibit liquid infiltration at the gap 408 between the lip 208 and the base end 204 of the container 202. In various embodiments as illustrated in FIG. 4B, a skirt 404 may comprise a portion of the container 202 wall which is bent relatively outward over the lip 208. In various embodiments as illustrated in FIG. 4C, a skirt 406 may be formed integrally and/or monolithic with the container 202. In various embodiments, the skirt 400, 404, 406 may comprise a part of rain abatement system 300.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A recovery parachute assembly, comprising:
a parachute container comprising an open base end;
a parachute packed within the container;
a plurality of riser lines and suspension lines packed within the container and proximate the open base end;
a tray including a lip configured to receive the open base end of the parachute container; and
a first standoff block coupled to the tray, wherein the first standoff block compresses at least one of the riser lines or suspension lines into the base end of the container and away from the tray,
wherein the first standoff block defines a channel between the lip of the tray and the first standoff block,
wherein the channel includes a plurality of drain holes formed along a distal edge of the tray.

2. The recovery parachute assembly of claim 1, further comprising a skirt coupled to the container.

3. The recovery parachute assembly of claim 1, wherein the lip defines a first basin and a second basin of the tray, wherein the first standoff block is coupled within the first basin and a second standoff block is coupled within the second basin.

4. The recovery parachute assembly of claim 3, further comprising a third standoff block coupled within the first basin, wherein the first standoff block and the third standoff block define an interblock channel therebetween.

5. The recovery parachute assembly of claim 2, wherein the skirt includes a flange portion and a deflector portion.

6. The recovery parachute assembly of claim 2, wherein the skirt extends outward of the container and over the lip.

7. The recovery parachute assembly of claim 2, wherein the skirt and the container are monolithic and wherein the first standoff block and the tray are monolithic.

8. An ejection seat for an aircraft, comprising:
- a seat bucket;
- a seat back coupled to the seat bucket;
- a propulsion system; and
- a parachute container comprising an open base end;
- a parachute packed within the container;
- a plurality of riser lines and suspension lines packed within the container and proximate the open base end;
- a tray including a lip configured to receive the open base end of the parachute container, wherein the tray is coupled to the seat back; and
- a first standoff block coupled to the tray, wherein the first standoff block compresses at least one of the riser lines or suspension lines into the base end of the container and away from the tray,
- wherein the first standoff block defines a channel between the lip of the tray and the first standoff block, wherein the channel includes a plurality of drain holes formed along a distal edge of the tray.

9. The ejection seat of claim 8, further comprising a skirt coupled to the container.

10. The ejection seat of claim 8, wherein the lip defines a first basin and a second basin of the tray, wherein the first standoff block is coupled within the first basin and a second standoff block is coupled within the second basin.

11. The ejection seat of claim 10, further comprising a third standoff block coupled within the first basin, wherein the first standoff block and the third standoff block define an interblock channel therebetween.

12. The ejection seat of claim 9, wherein the skirt includes a flange portion and a deflector portion.

13. The ejection seat of claim 9, wherein the skirt extends outward of the container and over the lip.

14. The ejection seat of claim 9, wherein the skirt and the container are monolithic and wherein the first standoff block and the tray are monolithic.

* * * * *